United States Patent
Hintz (10) Patent No.: US 8,939,367 B2
(45) Date of Patent: Jan. 27, 2015

(54) CAVITY AXIS ORIENTATION MEASUREMENT DEVICE

(71) Applicant: Kenneth James Hintz, Fairfax Station, VA (US)

(72) Inventor: Kenneth James Hintz, Fairfax Station, VA (US)

(*) Notice: Subject to any disclaimer, the term of this patent is extended or adjusted under 35 U.S.C. 154(b) by 135 days.

(21) Appl. No.: 13/827,230

(22) Filed: Mar. 14, 2013

(65) Prior Publication Data

US 2014/0203080 A1    Jul. 24, 2014

Related U.S. Application Data

(60) Provisional application No. 61/651,288, filed on May 24, 2012.

(51) Int. Cl.
*G06F 19/00* (2011.01)
*F41G 3/08* (2006.01)

(52) U.S. Cl.
CPC .................................. *F41G 3/08* (2013.01)
USPC .......................................... 235/404; 342/192

(58) Field of Classification Search
USPC ..................................... 235/404; 342/90, 192
See application file for complete search history.

(56) References Cited

U.S. PATENT DOCUMENTS

| | | | |
|---|---|---|---|
| 6,359,582 B1 | 3/2002 | MacAleese et al. | |
| 8,049,659 B1 | 11/2011 | Sullivan et al. | |
| 8,559,096 B2 * | 10/2013 | Gibson et al. | 359/296 |
| 2010/0079280 A1 | 4/2010 | Lacaze et al. | |
| 2012/0075958 A1 | 3/2012 | Hintz | |
| 2013/0106643 A1 * | 5/2013 | Wahlquist et al. | 342/27 |

* cited by examiner

*Primary Examiner* — Ahshik Kim (57) ABSTRACT

An apparatus for measuring the orientation of the longitudinal axis of a cavity comprising a signal receiver, a signal processor and analyzer and a cavity axis orientation analyzer. The signal receiver receives a reflected signal resulting from an interaction of multi-frequency irradiating signal(s) with at least one cavity. The irradiating signal may include an electromagnetic or acoustic signal above a cavity dependent cut-off frequency with a randomized or deterministic spectral component. The signal analyzer computes a power spectral density of the reflected signal. The local maxima of the power spectral density are identified and used to determine the cavity longitudinal axis orientation. The cavity may be the bore of a weapon.

16 Claims, 9 Drawing Sheets

CAVITY AXIS ORIENTATION MEASUREMENT DEVICE

CROSS-REFERENCE TO RELATED APPLICATIONS

This application claims the benefit of U.S. Provisional Application No. 61/651,288, filed May 24, 2012, entitled "Cavity Axis Orientation Measurement Device," which is hereby incorporated by reference in its entirety.

STATEMENT REGARDING FEDERALLY SPONSORED RESEARCH OR DEVELOPMENT

This invention was not made with government support.

BACKGROUND

There is a need for effective pre-engagement detection of snipers because a single shot casualty of a high-value target is often sufficient to achieve the sniper's objective and there is often no intent to fire a second round. Pre-engagement cavity axis orientation measurement of snipers provides a proactive ability to eliminate or significantly reduce the threat of snipers by notifying the potential victim of the orientation of a sniper's weapon before the sniper shoots. What is needed is a technology capable of measuring the orientation of the longitudinal axis of a cavity so as to determine the intended target of a weapon whether it is direct (e.g., a rifle) or indirect fire (e.g., ballistic trajectory of a mortar or artillery shell).

DETAILED DESCRIPTION OF EMBODIMENTS

Embodiments of the present invention measure cavity longitudinal axis orientation. Some embodiments may be configured to estimate the intended target of a sniper before he fires his weapon. Additional embodiments may be used to estimate the intended target of other barreled weapons. Embodiments may be configured to measure the axis orientation of numerous other objects with cavities including many non-military items such as exhaust pipes, jet engines, cavity defects in surfaces, etc.

Since many sniper weapons contain cavities, embodiments of the present invention may be utilized to measure a snipers' aiming point before they shoot. The aiming point of a weapon is where the axis of the weapon is pointed in order to effect the projectile to hit its intended target. We associate the aiming point of the weapon with the cavity longitudinal axis orientation. Knowing the aiming point of a weapons allows one to infer the intended target or whether oneself is the intended target.

Aiming and aiming point may mean the action of directing, pointing, leveling a gun, etc. Examples from its usage in gunnery are "In war, the target, even if visible, is often indistinct, and in this case . . . an 'aiming point' a conspicuous point quite apart and distinct from the target, has to be employed." and "Aiming Point, in gunnery, a stationary object . . . upon which the panoramic sight is directed after the proper deflection is set off."

Embodiments may also detect other objects which contain cavities. An underlying phenomenology is a measurable frequency-dependent modulation of a signal that occurs as a result of the interaction of an irradiating signal with a cavity. The existence of this cavity-induced modulation produces a signal which may be processed to determine the orientation of the longitudinal axis of the cavity relative to a frame of reference.

Unlike simpler reflecting surfaces, different electromagnetic wavelengths interacting with a cavity may reradiate signals whose amplitudes are modified by the presence of the cavity along a single angle from the cavity. The amplitude may be measured by a received signal's power. This interaction phenomenon may cause the electromagnetic wave to be reradiated differentially in amplitude at different frequencies. "Reradiated" as used here may be used interchangeably with the term "reflected" depending on the manner in which the reader understands the interaction of electromagnetic waves with materials. Alternatively, the interaction phenomenon may cause reradiated signals at a single frequency to be reradiated differentially in amplitude at different angles from the cavity. This differential radiation at different frequencies may express itself at a single angle of illumination and reradiation or as a spatially amplitude modulated pattern, the radar cross section, at a single frequency. The two phenomena being the Fourier transform of one another.

Figure 8:
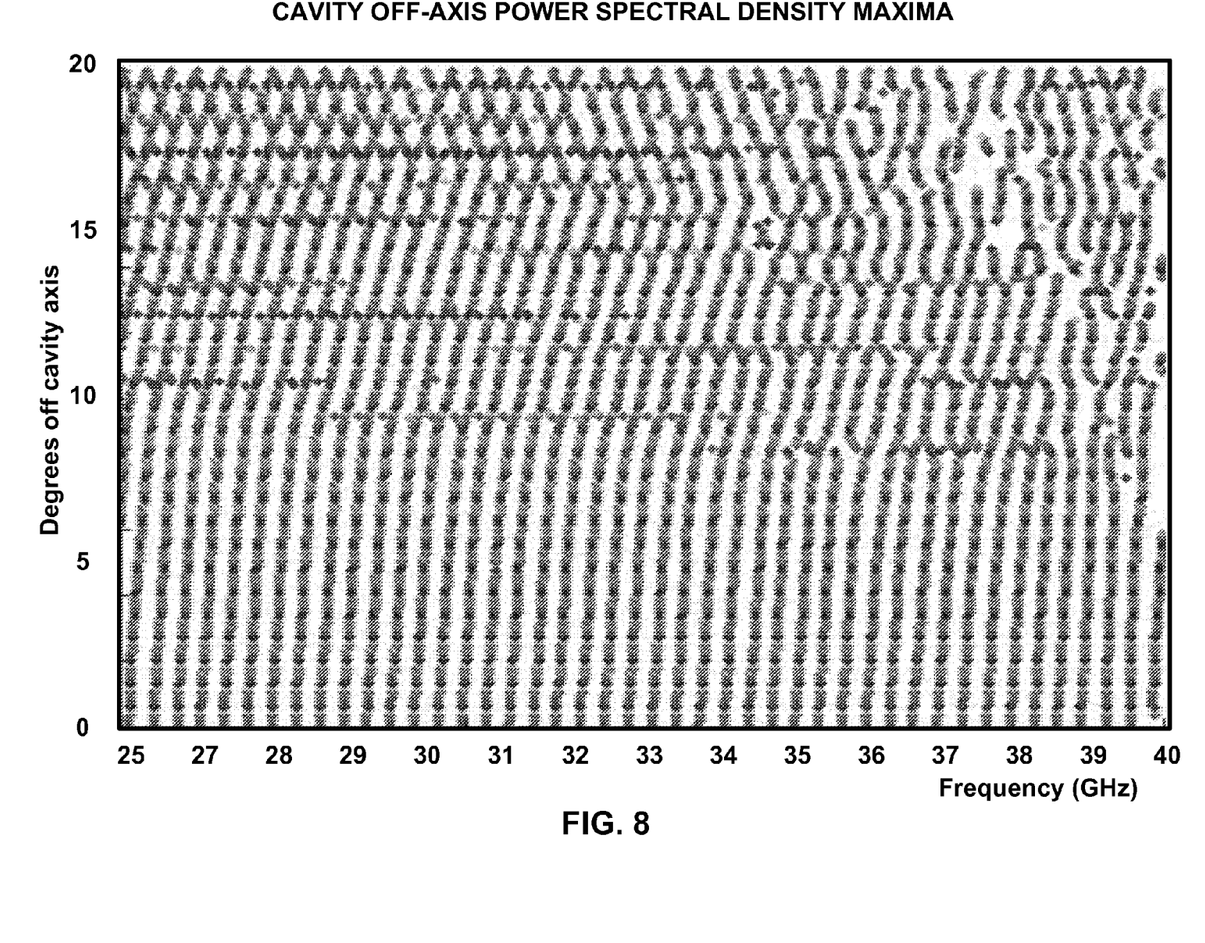
FIG. 8 is a plot of the maxima of the amplitude response of a resonant cavity when illuminated over a range of frequencies from 26 GHz to 40 GHz as a function of the cavity axis orientation.

The primary principle being exploited by this technology to measure the cavity axis orientation is that the frequencies of local maxima shift in the frequency domain as a function of the transmitted and received signal(s)'s angle(s) off the longitudinal axis of the cavity. This dependence is shown in FIG. 8, in which the reradiated electromagnetic energy has maxima at different frequencies as a function of the angle between the irradiating signals and the cavity axis and the angle between the received signal and the cavity axis. In this example of FIG. 8, the data were taken with almost co-located bistatic transmit and receive antennas on the longitudinal axis of the cavity. One skilled in the art can easily develop an analytical expression for this relationship, however the same relationship can be empirically derived from a series of measurements. The resulting empirical data can be used to create a look-up-table (LUT) which can be referred to in order to associate particular frequency maxima with a particular angle off the longitudinal axis of the cavity.

Figure 1:
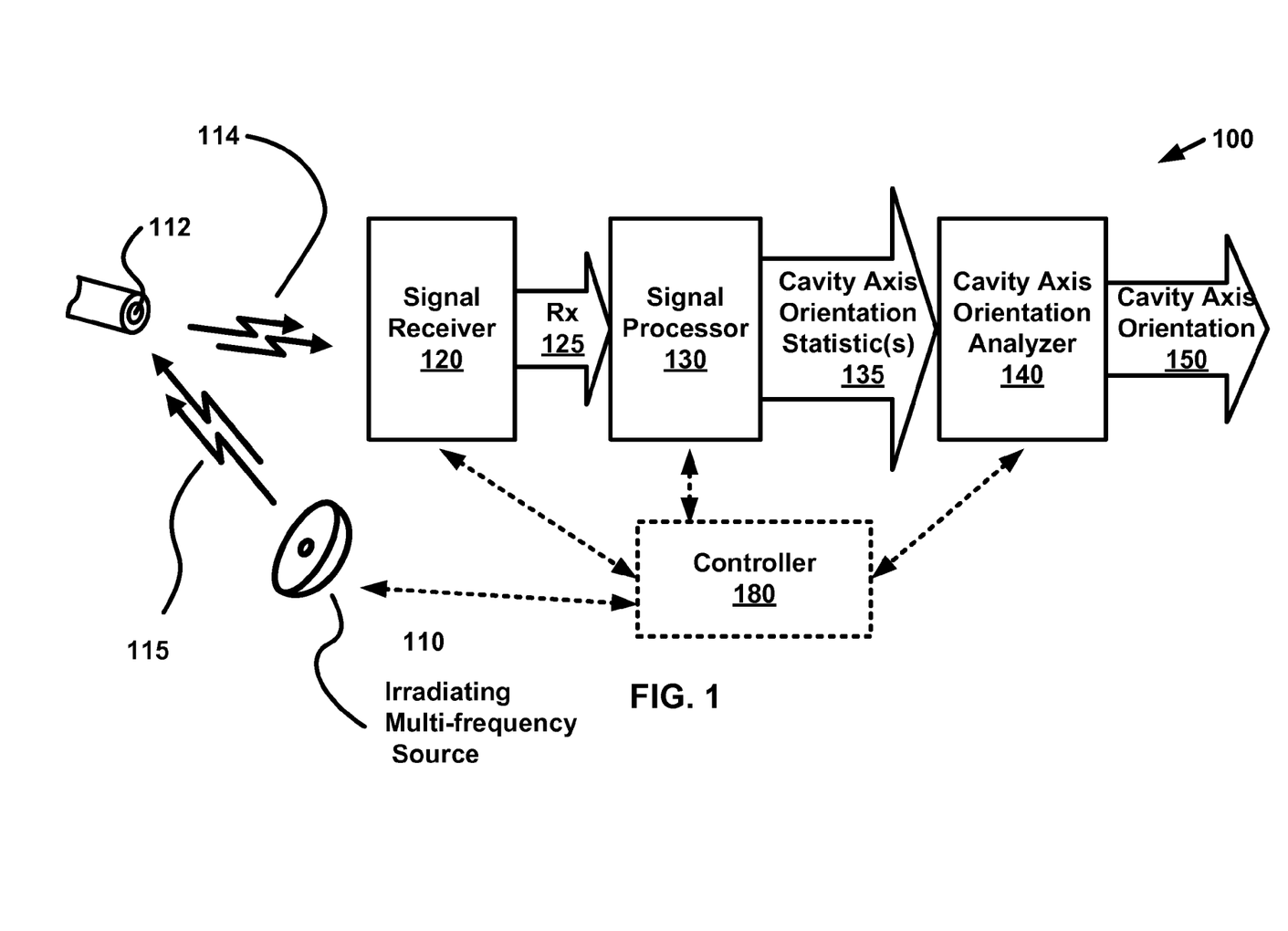
FIG. 1 is a block diagram of an example cavity axis orientation measurement device as per an aspect of an embodiment of the present invention.

Example FIG. 1 is a block diagram of an apparatus 100 configured to measure the orientation of a cavity's longitudinal axis. Embodiment 100 includes a signal receiver 120, a signal processor 130, cavity axis orientation statistics 135, cavity axis orientation analyzer 140, and cavity axis orientation 150. Additionally, in some embodiments, a controller 180 may be employed to coordinate the operation of the irradiating multi-frequency source 110, signal receiver 120, signal processor 130, and the cavity axis orientation analyzer 140.

The signal receiver 120 may be configured to receive reradiated signal(s) 114. Reradiated signal(s) 114 may result from an interaction of irradiating electromagnetic signal(s) 115 with a cavity 112. An irradiating electromagnetic signal is one which is transmitted from an antenna and directly or indirectly (through reflections or multipath) impinges on a cavity. The effect of this interaction may cause reradiated signal(s) 114 at different frequencies to be at different amplitudes. The effect of this interaction may cause the maxima amplitudes of reradiated signals to occur at different reradiated frequencies indicative of the cavity axis orientation.

According to embodiments, the irradiating signal(s) 115 may include multiple frequency components. In some embodiments, the irradiating signal(s) 115 may simultaneously include a multitude of frequency components. The multitude of frequency components may be above a cavity dependent cutoff frequency. At least some of the frequency components may be temporal in that they may be irradiated at different times. Alternatively, at least some of the frequency components may be combined. Irradiating signal(s) 115 may be generated by embodiment 100 or by other non-cooperating irradiating sources.

Irradiating signal(s) 115 may include electromagnetic signal(s), acoustic signal(s), propagating fields, or the like. In some embodiments, the irradiating signal(s) 115 may include a randomized spectral component. In other words, the irradiating signal 115 may not need to include a predetermined waveform. In yet another embodiment, the irradiating signal 115 may include a spread spectrum irradiating signal.

The irradiating signal(s) 115 may be generated by at least one irradiating multi-frequency source 110. Irradiating signal(s) may be generated using non co-located radiators. These non co-located radiators may be located spatially distinct from the signal receiver 120. The irradiating signal(s) 115 may be generated by non-cooperating multi-frequency sources such as commercial broadcast signals, radars, or other serendipitous or non-cooperating sources of radiating fields.

The reradiated signal 114 may be received by antenna(s) (not shown) and then directed to signal receiver 120 as received reflected signal 125. In some embodiments, the signal receiver 120 may be tunable to at least two frequencies. The signal receiver 120 may direct the reradiated signal 114 to signal processor 130.

According to some embodiments of the present invention, the signal processor 130 may be configured to compute the cavity axis orientation statistics 135 of the received reflected signal 125. Optionally, the signal processor 130 may compare the relative values of the received reradiated signals 125 from more than one reflected signal in order to provide more accurate cavity axis orientation statistics 135. Optionally, the signal processor 130 may include the known radiation angle and position of the irradiating multi-frequency source 110 into its calculations to form a more accurate measurement of the cavity axis orientation statistics 135.

The signal analyzer 130 may be as simple as computing the average received power in defined frequency bands and determining the frequencies at which there are local amplitude peaks (maxima). It may also take into account non-uniform effective radiated power (ERP) and propagation losses at different frequencies of the irradiating signal(s) 115.

Figure 2:
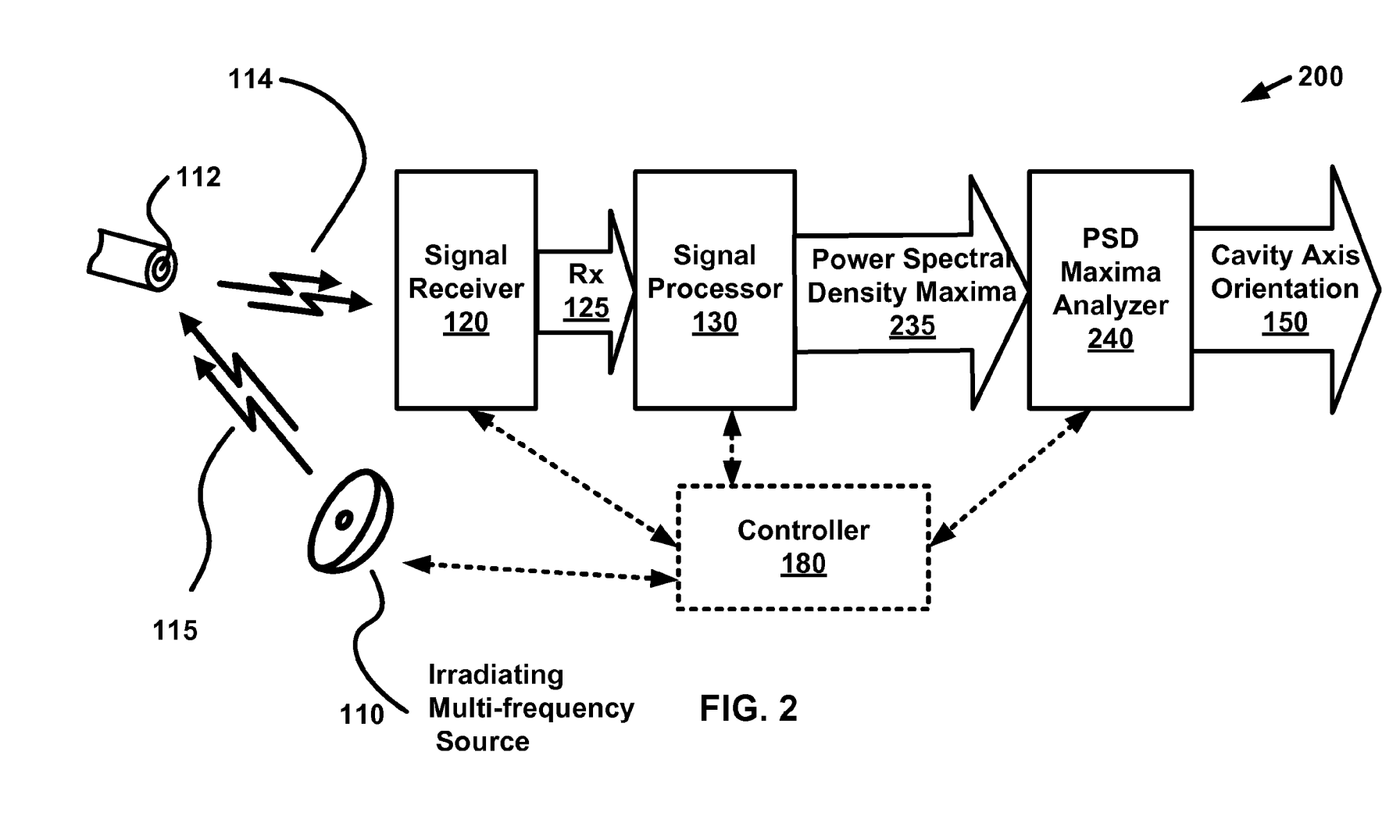
FIG. 2 is a block diagram of an example cavity axis orientation measurement device that uses a power spectral density (PSD) and local PSD maxima analyzer as per an aspect of an embodiment of the present invention.

Example FIG. 2 is a block diagram of an embodiment of an apparatus 200, wherein the signal processor 130 may compute the power spectral density (PSD) and the local maxima in order to produce the power spectral density maxima 235. PSD maxima analyzer 240 receives the power spectral density maxima 235 and through analytical means or a LUT, produces an estimate of the cavity axis orientation 150.

One skilled in the art will recognize statistics other than the PSD may also be used to produce the power spectral density maxima 235.

Figure 3:
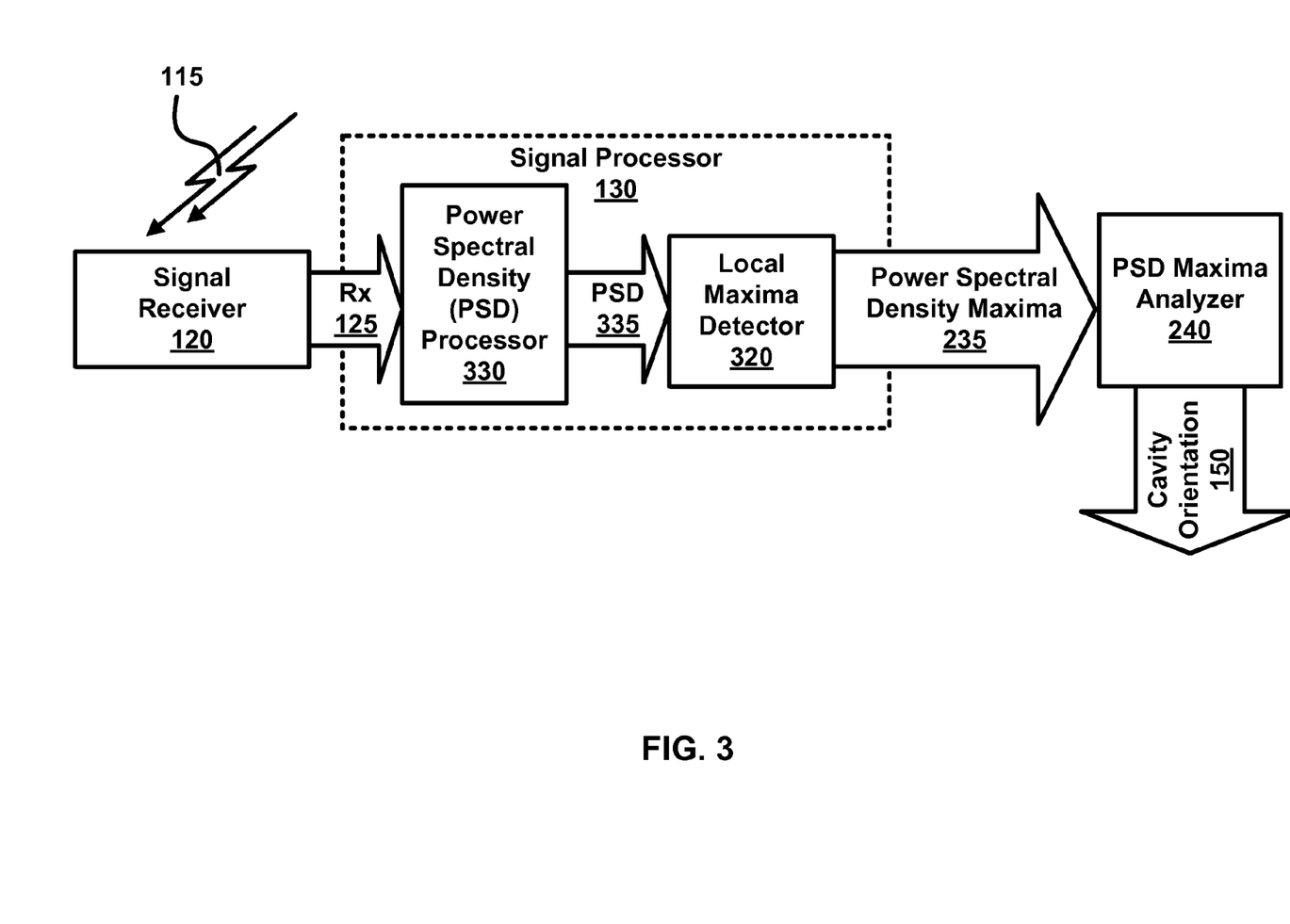
FIG. 3 is a block diagram of an example cavity axis orientation measurement device with an expanded signal analyzer block as per an aspect of an embodiment of the present invention.

FIG. 3 is a block diagram of an apparatus 100 configured to measure the orientation of a cavity's longitudinal axis with an expanded signal processor block as per an aspect of an embodiment of the present invention. In this example embodiment, a power spectral density processor 330 calculates a power spectral density (PSD) 335 from received signal 125. The PSD is a computation of the received signal's power as a function of the wavelength or frequency of the received electromagnetic signal.

The terms wavelength and frequency are used interchangeably herein as it is well known that the velocity of a signal in a propagating medium is equal to the frequency of the signal multiplied by the wavelength of the signal in that medium.

A local maxima detector 320 may compute power spectral density maxima 235 of the received signal 125 by comparing adjacent values within a window or smoothed window to determine which is the largest or most frequently occurring value. The PSD by its definition is comprised only of positive values and hence numbers less than zero need not be taken into account. By smoothed windows is meant a region of data to which an apodizing (also called a tapering) function or a low pass filter has been applied.

Figure 4:
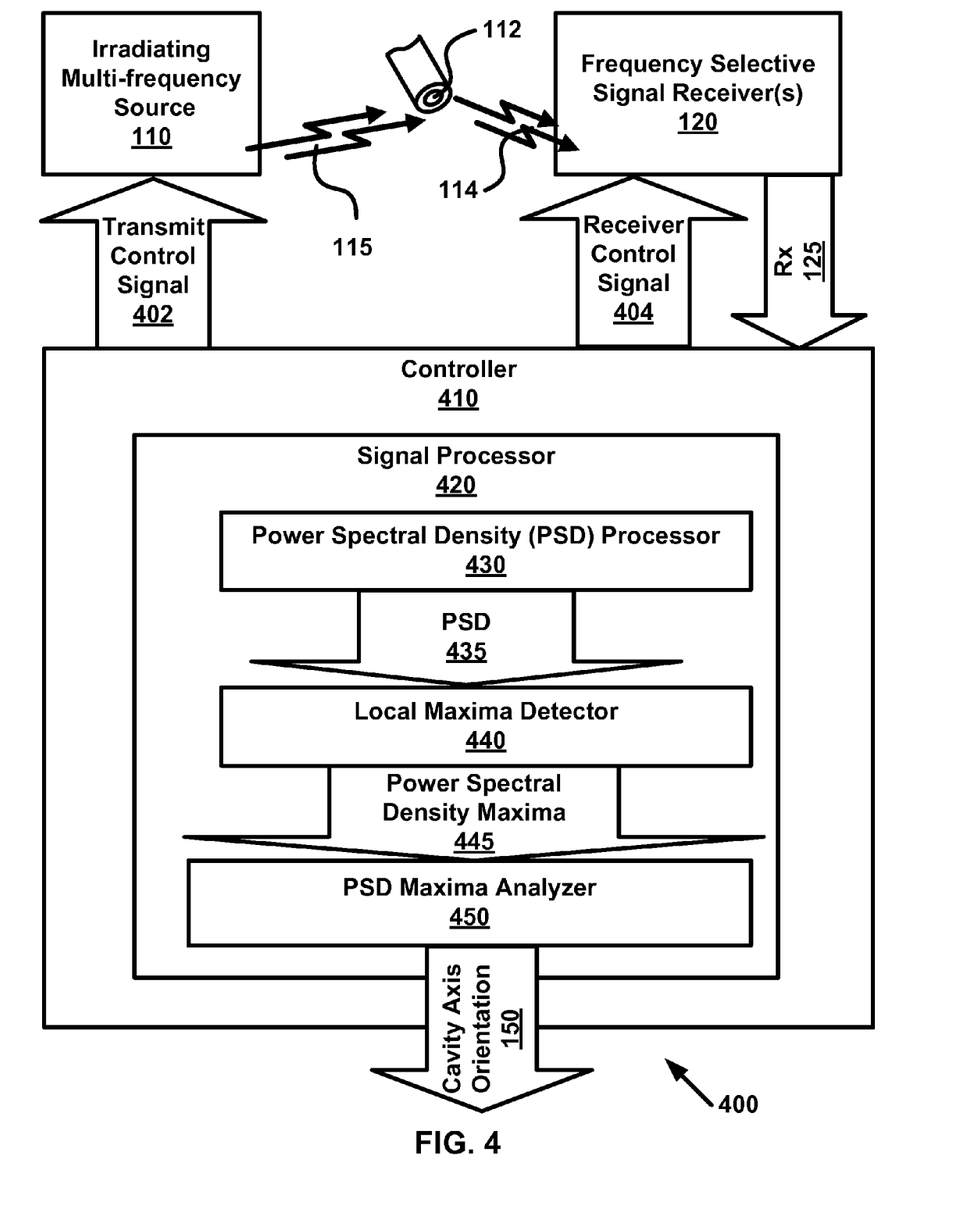
FIG. 4 is a block diagram of an example cavity axis orientation measurement device configured to use a controller as per an aspect of an embodiment of the present invention.

FIG. 4 is a block diagram of an apparatus 400 configured to measure the orientation of a cavity's longitudinal axis configured to use a controller as per an aspect of an embodiment of the present invention. This embodiment shows the use of a controller 410. Controller 410 may be a special purpose hardware device configured to detect a cavity such as a field programmable gate array (FPGA) or application specific integrated circuit (ASIC). As shown in FIG. 4, controller 410 may control transmit control signal 402 and receiver control signal 404. Transmit control signal 402 controls a radiating multi-frequency source 110. Example controls may direct a radiating multi-frequency source 110 when to radiate, when not to radiate, what frequencies to radiate at, what powers to radiate, or the like. Like previous examples, irradiating signal 115 may interact with cavity 112.

The result of this interaction with cavity 112 may result in reradiated signal 114. Frequency selective signal receiver 120 may receive this reradiated signal 114. Receiver control signal 404 may control frequency selective signal receiver 120. Example controls may include received times, received frequencies, filtering, or the like. The output of the frequency selective signal receiver 120 may be forwarded to controller 410 for further processing. Controller 410 may use hardware, software or a combination thereof to process received signal 125.

Signal processor 420 may include a series of modules including: power spectral density (PSD) processor module 430, local maxima detector module 440, and PSD maxima analyzer module 450. PSD Processor module 430 generates an PSD function 435 from the received signal 125 as described earlier. Local maxima detector module 440 analyzes PSD function 435 to determine PSD maxima 445 that may be useful in estimating cavity longitudinal axis orientation 150 in PSD maxima analyzer module 450.

Figure 5:
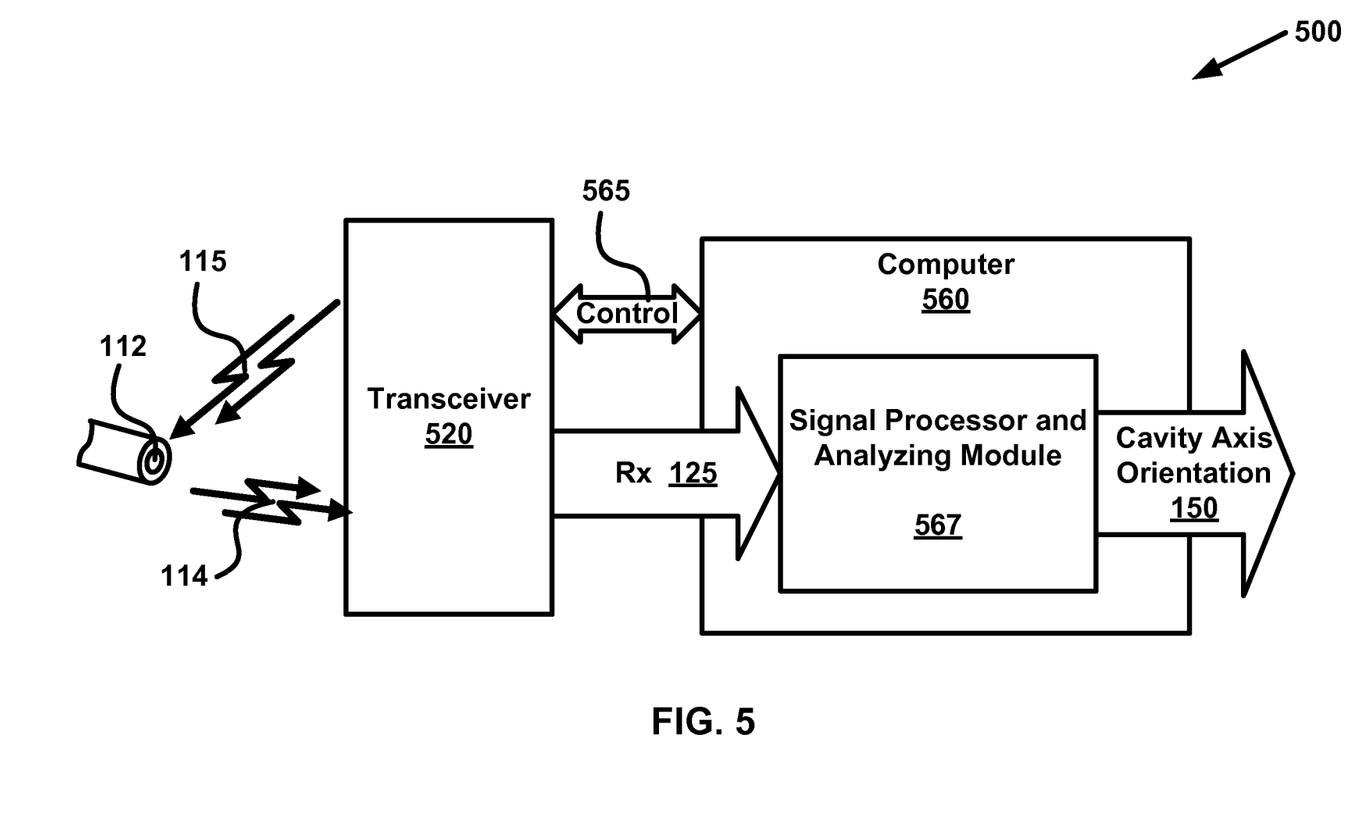
FIG. 5 is a block diagram of an example cavity axis orientation measurement device configured to use a computer as per an aspect of an embodiment of the present invention.

FIG. 5 is a block diagram of an apparatus 500 configured to measure the orientation of a cavity's longitudinal axis configured to use a computer as per an aspect of an embodiment of the present invention. Some embodiments of the present invention may utilize a computer 560 to perform the signal processing required to measure the orientation of a cavity's longitudinal axis from received signal 125. Computer 560 may be a general purpose computer configured to be able to receive signal 125 and control a transceiver 520 using control signal 565. The received signal 125 may be received using a standard computer port such as a USB port, a serial port, a parallel port, wireless communications, or the like. Similarly, control signals 565 may also be transmitted and/or received using a standard computer port. Computer 560 may also be configured to use specialized hardware to perform these interface functions. Transceiver 520 may be a monostatic, bistatic, or multi-static radar device. For example, transceiver 520 may be any type of transceiver capable of generating an irradiation signal 115 and receiving a received returned signal 125.

Signal processing and analyzing module 567 may be a hardware module, a software module and/or a combination thereof located either locally or remotely. One embodiment may include running a software module developed using a mathematical, scientific or engineering computation program such as MATLAB® or the like. In other embodiments, the software module may actually be an operational version of the mathematical simulation program. Yet other embodiments may utilize a combination of a mathematical simulation program in combination with hardware acceleration modules.

Figure 6:
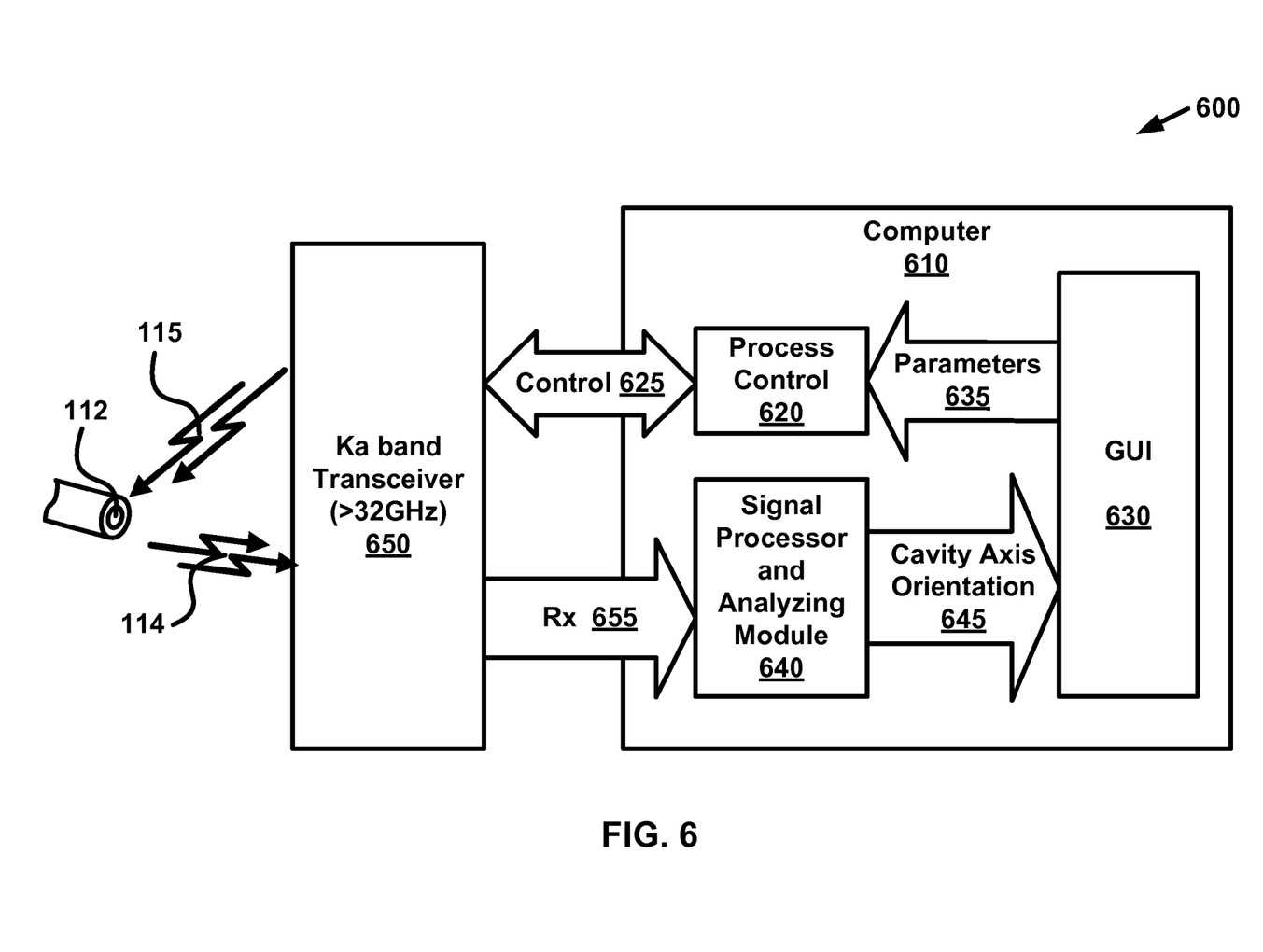
FIG. 6 is a block diagram of an example cavity axis orientation measurement device configured to use a computer as per an aspect of an embodiment of the present invention.

FIG. 6 is a block diagram of an apparatus 600 configured to measure the orientation of a cavity's longitudinal axis configured to use a computer 610 as per an aspect of an embodiment of the present invention. As illustrated, computer 610 interfaces with a Ka band transceiver 650 using unidirectional or multi-directional control signals 625 through process control 620. Received signal 655 is received from transceiver 650 by signal processor and analyzing module 640. Computer 610 provides hardware to transmit and receive the signals 625 and 655. Received signal 655 may be digital and/or analog. In the case where signal 655 is analog, computer 610 may need specialized receive hardware. A graphical user interface (GUI) 630 may run on computer 610 as an interface to a user. GUI 630 may allow the user to specify parameters 635 either directly or indirectly. Indirect specification of parameters 635 may be through the manipulation of a graphical representation (or the like) that has meaning to a users and is capable of being converted into an explicit parameter. These parameters 635 may be interpreted by process control to control transceiver 650. Signal analyzing module 640 may process received signal 655 as described earlier to generate cavity axis orientation 645. This cavity axis orientation 645 may be presented to user through GUI 630 either directly or indirectly. The GUI may also contain audio or other perceivable components.

As shown, transceiver 650 operates in the Ka frequency band. This band may be useful because of its wavelength and the availability of low-cost components used in commercial radar devices such as police radar guns. However, one skilled in the art will recognize that other transceivers utilizing other frequency bands may be used as long as they exhibit signal characteristics described herein such as being above the waveguide cutoff frequency, sufficient bandwidth, and power.

A cavity is a hollow place or a void or empty space within a solid body. Furthermore, a cavity as used in this disclosure may mean volumes of a material with one physical property contained in whole or in part in an object comprised of a material with physical properties sensibly different from the included volume. Furthermore, if the surface of the body is electrically conductive, then cavities as used in this disclosure may mean indentations in the surface. In some embodiments of the invention, the apparatus may be configured to locate the aimpoint of a sniper rifle. In these types of embodiments, the cavity may be a firearm bore.

Figure 7:
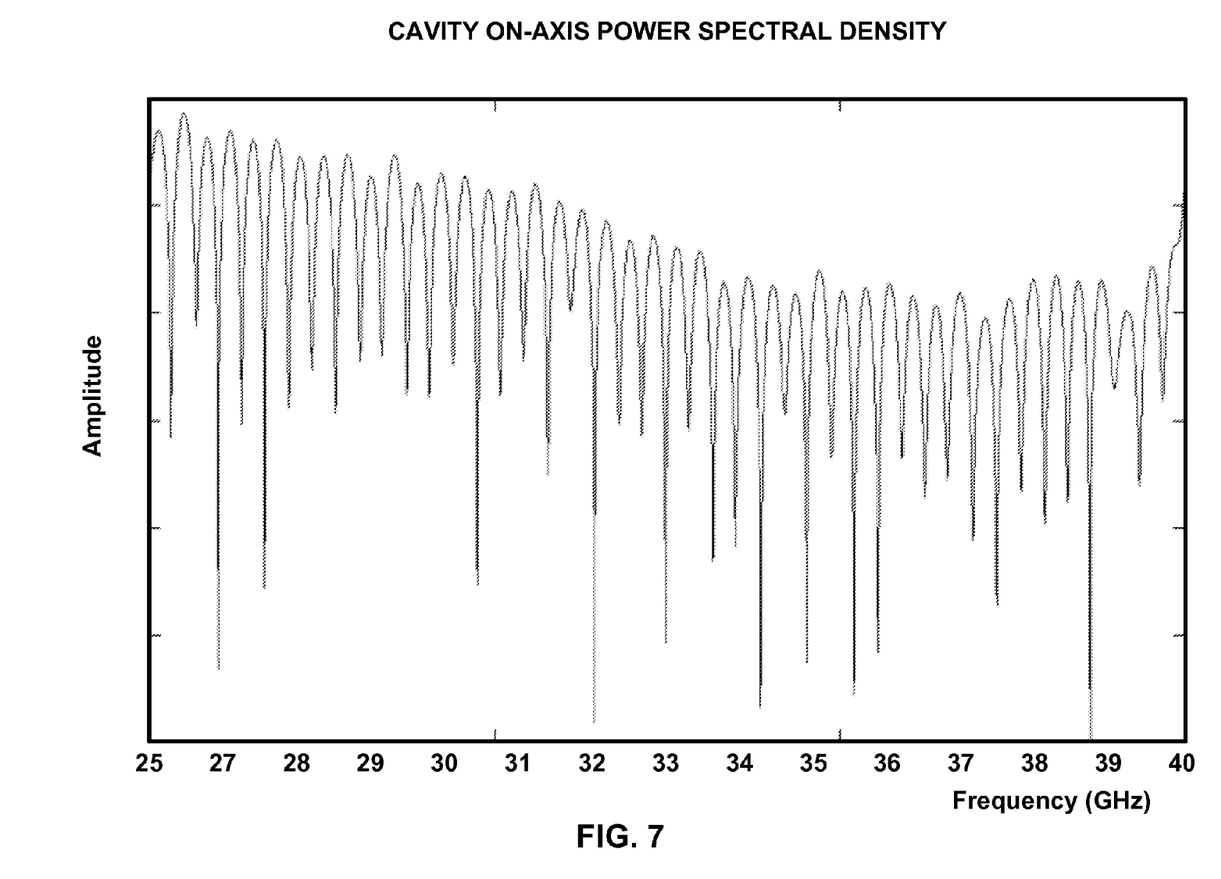
FIG. 7 is a plot of the power spectral density (PSD) of a resonant cavity when illuminated over a range of frequencies from 25 GHz to 40 GHz.

FIG. 7 is a plot of the on-(cavity)axis power spectral density of the received signal reradiated from a cavity when illuminated over a range of frequencies from 25 GHz to 40 GHz. These measured values demonstrate the characteristic locally maximum amplitudes at specific frequencies. The signal processing of this PSD produces the frequencies at which maximum local amplitude occur. Specifically, this plot is the result of return signal measurements from the irradiation of an 18" long by 5/16" diameter brass tube closed at one end and open at the irradiated end.

FIG. 8 is a plot of the off-(cavity)axis power spectral density of a cavity when illuminated over a range of frequencies from 25 GHz to 40 GHz. The measurements are made at angles off-(cavity)axis from 0 through 20 degrees. The plot consists of points representing the frequencies at which maximum local amplitude occur at each angle. Analysis of these measured values demonstrates the characteristic locally maximum amplitudes at specific frequencies that the signal processing produce the orientation of a cavity's longitudinal axis and that the frequencies of these maxima occur at different illuminating frequencies. Specifically, this plot is the result of return signal measurements from the irradiation of an 18" long by 5/16" diameter brass tube closed at one end and open at the irradiated end. From this type of data, an empirically derived look-up-table (LUT) can be derived or an analytical expression can be derived.

Figure 9:
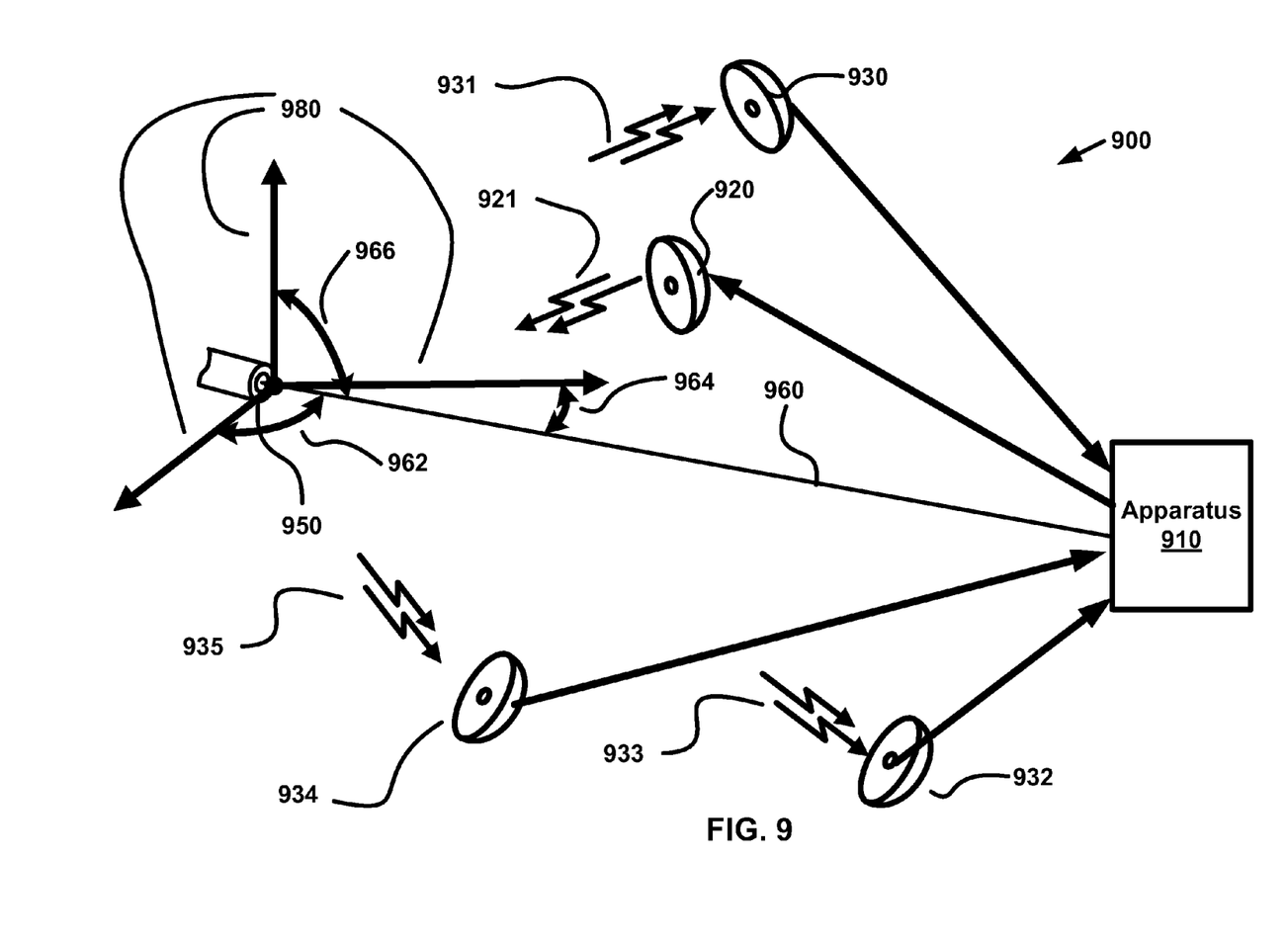
FIG. 9 is a diagram illustrating an example configuration that uses multiple receivers and associated geometry to determine the cavity axis orientation as per an aspect of an embodiment of the present invention.

FIG. 9 is a block diagram showing how an embodiment of the present invention may be used to measure a cavity's longitudinal axis orientation such as that of a sniper rifle relative to a frame of reference. As illustrated in this example, multiple reception antennas (930, 932, and 934) may be located at known positions relative to apparatus 910. Irradiation source(s) such as irradiation source 920 produce irradiating signal(s) 921 which interact with cavity 950 producing reflected signals 931, 933, and 935. Reflected or reradiated signals 931, 933, and 935 may then be received by multiple reception antennas (930, 932, and 934). The signal strength and other measurements such as the maxima of the power spectral density may be utilized to determine the angle 966, 962, and 964 from the longitudinal axis of the cavity 960 and a frame of reference 980. These angles are determined by combining the measured PSD maxima derived from the reflected signals 931, 933, and 935, irradiation source 920, and their location geometry.

Receiving antenna(s) (e.g. 930, 932, and 934) may be either directional or omnidirectional as the measurement of the cavity's longitudinal axis orientation is determined by the locations of the maxima of the modulation induced on the reradiated signal by the configuration of the cavity as well as the angle of the transmitting and receiving antenna(s) off the longitudinal axis of the cavity.

Various embodiments may use different signal receivers that are compatible with the signal processing methodology used. For example, the signal receiver may be a frequency selective signal receiver configured to be used in temporally determining frequency specific signal statistics. According to some embodiments, the frequency selective signal receiver may be configured to sweep continuously or discretely step over a prescribed bandwidth and receive wavelengths which have illuminated and been reradiated by a cavity. A frequency selective signal receiver is a receiver that can distinguish between a signal received at different frequencies. As a second example, the signal receiver may be a wider band signal receiver configured to be used in simultaneously determining signal statistics.

Another embodiment of the irradiating signal is to utilize an irradiating signal which contains multiple frequencies in a single transmitted waveform such as a chirp signal. The necessary PSD can be derived from the reception and extraction of individual frequency components from the chirp signal by methods well known in the art. Additionally, an irradiating signal may include random pseudo-random or deterministic frequency components transmitted in a random, pseudo-random, or deterministic order.

Usable wavelengths for irradiating the cavity may be at least those wavelengths which are above the waveguide cutoff frequency, the calculation of which may depend on the electromagnetic modes in the cavity and whether the cavity is circular or rectangular in cross section or simply symmetric in shape, as well as the polarization of the irradiating and received signals (e.g., HH, HV, VV, VH, or RH or LH circular or combinations thereof). The sweep bandwidth of this frequency selective signal receiver may need to be wide enough to allow at least one complete cycle of amplitude modulation to insure that a local maxima can be detected.

The output of the receiver may be transferred to a signal analyzer which computes statistics of the reradiated signal. A statistic is, in its most general form, a numerical computation on a set of numbers.

In an alternative embodiment, material properties of the cavity itself may change the characteristics of the reradiated energy by affecting the waveguide propagation velocity. Such properties include the internal surface of the cavity and whether it is made of electrically conductive, partially-conductive, or non-conductive material. In combination with or in addition to the material comprising the internal surface of the cavity, the walls of the material may be made of a material which is dielectrically or acoustically distinct from the material in the cavity.

Alternative embodiments may be configured to respond to cavities of different geometries. These geometries can include symmetrical cross sections. Symmetrical cross sections can be either circularly symmetric or simply symmetric about one or more axes.

In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e, hardware with a biological element) or a combination thereof, all of which are behaviorally equivalent. For example, modules may be implemented as a software routine written in a computer programming language (such as C, C++, Fortran, Java, Basic, MATLAB®, or the like) or a modeling/simulation program such as Simulink®, Stateflow®, GNU Octave, or LabVIEW® MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASIC); field programmable gate arrays (FPGA); and complex programmable logic devices (CPLD). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described example embodiments. For example, the irradiating signal can be any type of propagating wave and could be electromagnetic or acoustic. The cavity can be open or closed and, depending on the type of irradiating signal, can be made of electrically conductive or non-conductive material or coatings.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The in invention claimed is:

1. An apparatus comprising:
  a) a frequency selective signal receiver configured to receive at least one reradiated signal resulting from an interaction of an irradiating electromagnetic signal with a cavity, the irradiating electromagnetic signal including at least 3 frequency components above a cavity bore dependent cutoff frequency;
  b) a signal processor configured to compute:
    i) a power spectral density of the received reradiated signal, and, ii) identify frequencies of largest local amplitude in the power spectral density;
c) an analyzer configured to relate at least one identified frequency of largest local amplitude with an orientation of the cavity longitudinal axis.

2. An apparatus comprising:
a) a signal receiver configured to receive at least one reradiated signal resulting from an interaction of at least one irradiating signal with at least one cavity;
b) a signal analyzer configured to compute at least one power spectral density of at least one of the at least one reradiated signal;
c) an analyzer configured to relate at least one of the frequencies of the at least one power spectral density with the orientation of the cavity axis.

3. An apparatus according to claim 2, wherein the at least one irradiating signal includes at least three frequency components.

4. An apparatus according to claim 2, wherein the at least one irradiating signal includes an electromagnetic signal.

5. An apparatus according to claim 2, wherein the at least one irradiating signal includes an acoustic signal.

6. An apparatus according to claim 2, wherein the analyzer employs a look-up table.

7. An apparatus according to claim 2, wherein the analyzer employs an analytic expression.

8. An apparatus according to claim 2, wherein the at least one irradiating signal includes a randomized spectral component.

9. An apparatus according to claim 2, wherein the at least one irradiating signal includes a spread spectrum irradiating signal.

10. An apparatus according to claim 2, wherein the at least one irradiating signal is generated using at least two non co-located radiators.

11. An apparatus according to claim 2, wherein the at least one irradiating signal originates from a location spatially distinct from the signal receiver.

12. An apparatus according to claim 2, wherein at least one reradiated signal is above a cavity dependent cutoff frequency.

13. An apparatus according to claim 2, wherein the cavity is a weapon bore.

14. An apparatus according to claim 2, wherein said apparatus is configured to determine at least one of the following:
a) the azimuth orientation relative to a frame of reference,
b) the elevation orientation relative to a frame of reference, or,
c) a combination of the above.

15. An apparatus according to claim 2, wherein the signal receiver is tunable to at least three frequencies.

16. An apparatus according to claim 2, wherein the measurement of the orientation of the longitudinal axis of the cavity is used to aim a weapon in the direction of at least one of the at least one cavity.

* * * * *